United States Patent
Abe (10) Patent No.: US 8,174,802 B2
(45) Date of Patent: May 8, 2012

(54) SWITCHING REGULATOR AND OPERATIONS CONTROL METHOD THEREOF

(75) Inventor: Hirohisa Abe, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 12/375,488

(22) PCT Filed: May 29, 2008

(86) PCT No.: PCT/JP2008/060328
§ 371 (c)(1),
(2), (4) Date: Jan. 28, 2009

(87) PCT Pub. No.: WO2008/149915
PCT Pub. Date: Dec. 11, 2008

(65) Prior Publication Data
US 2009/0303641 A1    Dec. 10, 2009

(30) Foreign Application Priority Data
Jun. 5, 2007    (JP) .................................. 2007-149274

(51) Int. Cl.
*H02H 7/00* (2006.01)
*H02H 9/00* (2006.01)

(52) U.S. Cl. .......................................................... 361/18

(58) Field of Classification Search ...................... 361/18
See application file for complete search history.

(56) References Cited

U.S. PATENT DOCUMENTS
2007/0040599 A1    2/2007   Sato
2007/0064455 A1    3/2007   Suzuki

FOREIGN PATENT DOCUMENTS

| JP | 2-223377 | 9/1990 |
|---|---|---|
| JP | 2001-314097 | 11/2001 |
| JP | 2004-40858 | 2/2004 |
| JP | 2004-40858 A * | 2/2004 |
| JP | 2005-78557 | 3/2005 |
| JP | 2006-115594 | 4/2006 |
| JP | 2007-80478 | 3/2007 |
| JP | 2007-89239 | 4/2007 |

* cited by examiner

*Primary Examiner* — Jared Fureman
*Assistant Examiner* — Lucy Thomas
(74) *Attorney, Agent, or Firm* — Cooper & Dunham LLP (57) ABSTRACT

A switching regulator is disclosed. In the switching regulator, when a power source voltage is lowered to a first predetermined value due to an overcurrent, a voltage boost operation is temporarily stopped, and a delay timer of a delay circuit is not reset. When the overcurrent is detected again due to a rise of the power source voltage after temporarily stopping the voltage boost operation, the delay timer of the delay circuit continues to count the delay period. The voltage boost operation is completely stopped by receiving a signal output from the delay circuit when the delay timer completes the counting after passing a predetermined delay period.

16 Claims, 10 Drawing Sheets

Prior Art

SWITCHING REGULATOR AND OPERATIONS CONTROL METHOD THEREOF

TECHNICAL FIELD

The present invention generally relates to a switching regulator having a UVLO (under-voltage lockout) circuit which prevents error operations due to lowering of a power source voltage and an operations control method of the switching regulator.

BACKGROUND ART

Conventionally, a switching regulator provides a UVLO circuit which stops operations of a control circuit for preventing an error in the operations when a power source voltage becomes, a value less than a predetermined value (for example, refer to Patent Document 1).

Figure 10:
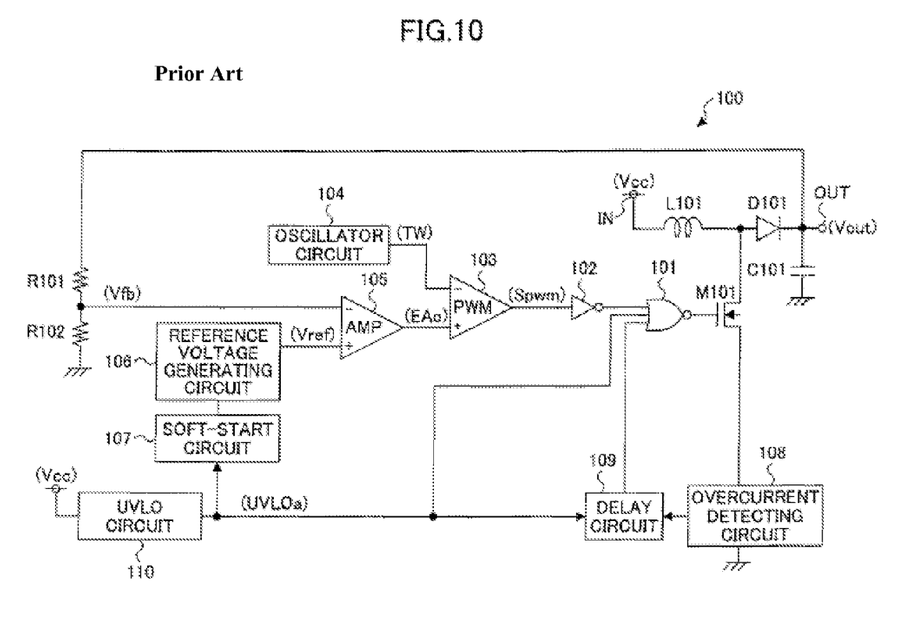
FIG. 10 is a circuit diagram showing a conventional boost type switching regulator having a UVLO circuit.

FIG. 10 is a circuit diagram showing a conventional boost type switching regulator having a UVLO circuit.

In a switching regulator 100 shown in FIG. 10, a power source voltage Vcc is raised to be a predetermined voltage and the raised voltage is output as an output voltage Vout from an output terminal OUT, and PWM (pulse width modulation) control is applied to control an on-duty cycle of a switching transistor M101 so that a divided voltage Vfb formed by dividing the output voltage Vout becomes a reference voltage Vref.

An overcurrent detecting circuit 108 detects an overcurrent output from the output terminal Vout by using a current flowing into the switching transistor M101. When the overcurrent detecting circuit 108 detects the overcurrent, a delay circuit 109 outputs a high level signal after a predetermined delay period has passed, and stops a voltage boost operation by switching off the switching transistor M101 via a NOR circuit 101.

In addition, a UVLO circuit 110 monitors the power source voltage Vcc, and outputs a low voltage detection signal UVLOa of a high level when the power source voltage Vcc is lowered to a value less than a predetermined value. Further, the UVLO circuit 110 causes the switching transistor M101 to enter a cut-off status by switching off the switching transistor M101, initializes a soft-start circuit 107 so that the soft-start circuit 107 can execute a soft start operation when the voltage boost operation restarts, and causes the delay circuit 109 to reset a delay timer which counts the delay period so that the counting number of the delay timer becomes a predetermined initial value.

In addition, a switching regulator control circuit is disclosed (for example, refer to Patent Document 2). The switching regulator control circuit provides a first UVLO circuit and a second UVLO circuit whose detection voltages are different from each other for controlling operations of an output buffer circuit. The structure and purpose of the present invention are different from those in Patent Document 2.

[Patent Document 1] Japanese Laid-Open Patent Application No. 2006-115594
[Patent Document 2] Japanese Laid-Open Patent Application No. 2005-078557

However, in FIG. 10, in a case where an overcurrent is generated due to some reason and a signal showing generation of the overcurrent is output from the overcurrent detecting circuit 108 to the delay circuit 109, after the delay timer of the delay circuit 109 starts to count the delay period, when the power source voltage Vcc is lowered and the UVLO circuit 110 outputs the low voltage detection signal UVLOa of the high level, the delay circuit 109 resets the counting number of the delay timer to be the initial value.

After this, when the power source voltage Vcc is raised, the UVLO circuit 110 makes the low voltage detection signal UVLOa a low level, and if for some reason the overcurrent problem is not solved, the overcurrent detecting circuit 108 detects the overcurrent and the above operations are repeated. Since the switching transistor M101 is normally controlled to be in an on or off status until the delay timer of the delay circuit 109 completes counting the predetermined period, an overcurrent preventing operation is not executed even if the switching regulator 100 has the overcurrent detecting circuit 108 and the delay circuit 109.

SUMMARY

In an aspect of this disclosure, there is provided a switching regulator and an operations control method of the switching regulator, in which when a power source voltage becomes a value less than a first predetermined value, operations of a switching transistor are stopped by turning off the switching transistor. When the power source voltage becomes a value less than a second predetermined value lower than the first predetermined value, an overcurrent preventing operation is stopped. That is, in the switching regulator and the operations control method of the switching regulator, even if the power source voltage is raised again after stopping the operations of the switching transistor without ascertaining a reason for the overcurrent, the overcurrent is surely prevented.

In another aspect, there is provided a switching regulator which converts a power source voltage input to an input terminal into a predetermined constant voltage and outputs the predetermined constant voltage from an output terminal as an output voltage. The switching regulator includes a first switching element which switches between on and off statuses corresponding to an input control signal, an inductor which is electrically charged by the power source voltage when the first switching element is switched to the on status, a rectifying element which causes the inductor to discharge electric charges when charging of the inductor is stopped while the first switching element is switched to the off status, a control circuit section which controls switching the first switching element between the on and off statuses so that the output voltage to be output from the output terminal becomes equal to the predetermined constant voltage, an overcurrent detecting circuit section which detects an overcurrent output from the output terminal and causes the control circuit section to switch off the first switching element so that the first switching element enters a cut-off status when a predetermined delay period has passed after detection of the overcurrent, and an UVLO (under-voltage lockout) circuit which causes the control circuit section to switch off the first switching element when the power source voltage is lowered to a value less than a first predetermined value and causes the overcurrent detecting circuit section to stop counting the delay period and to reset the delay period to an initial value when the power source voltage is lowered to a value less than a second predetermined value lower than the first predetermined value.

In another aspect, there is provided an operations control method of a switching regulator. The switching regulator includes a first switching element which switches between on and off statuses corresponding to an input control signal, an inductor which is electrically charged by a power source voltage when the first switching element is switched to the on status, and a rectifying element which causes the inductor to discharge electric charges when charging of the inductor is stopped while the first switching element is switched to the off status. The operations control method controls the first switching element to switch to the on status/the off status so that an output voltage from an output terminal of the switching regulator becomes equal to a predetermined constant voltage, by converting the power source voltage into the predetermined constant voltage. The operations control method includes the steps of detecting an overcurrent output from the output terminal, causing the first switching element to switch off and to enter a cut-off status when a predetermined delay period has passed after detection of the overcurrent, causing the first switching element to switch off when the power source voltage is lowered to a value less than a first predetermined value, and stopping counting the predetermined delay period and resetting the delay period to an initial value when the power source voltage is lowered to a value less than a second predetermined value lower than the first predetermined value.

According to an embodiment of the aforementioned switching regulator, when an overcurrent output from an output terminal is detected and a power source voltage is lowered to a value less than a first predetermined value, a delay timer continues to count a predetermined delay period, and a first switching element is temporarily switched off. When the power source voltage is lowered to a value less than a second predetermined value lower than the first predetermined value, counting the delay period by the delay timer is stopped and the delay timer is initialized. Therefore, even if the power source voltage is raised again after temporarily stopping the operations of the switching element without determining a reason for the overcurrent, the overcurrent is surely prevented.

In addition, a first proportional voltage proportional to the power source voltage, and a second proportional voltage lower than the first proportional voltage proportional to the power source voltage are generated; the first proportional voltage is compared with a second reference voltage, and the second proportional voltage is compared with the second reference voltage. Further, a third proportional voltage proportional to the power source voltage is generated, and the third proportional voltage is compared with the second reference voltage and a third reference voltage lower than the second reference voltage. Therefore, even if characteristics of elements of the switching regulator are changed due to dispersion in the manufacturing processes, when the power source voltage is lowered to a value less than a first predetermined value, the first switching element can be switched off, and when the power source voltage is lowered to a value less than a second predetermined value lower than the first predetermined value, counting the delay period by a delay timer is stopped and the delay timer can be reset to an initial value.

In addition, a first reference voltage is generated by a soft-start operation which gradually raises a voltage at a predetermined speed for a predetermined period after starting up the switching regulator, and when the power source voltage is lowered to a value less than the first predetermined value, the soft-start operation is initialized. Therefore, an error in the soft-start operation due to lowering the power source voltage can be prevented.

In addition, a hysteresis voltage is provided in the power source voltage so that chattering noise of signals output from voltage comparing circuits can be lowered.

In addition, a first switch is provided which applies the power source voltage to a voltage dividing circuit of a UVLO circuit corresponding to a control signal input from an external device. Therefore, power consumption can be reduced when the UVLO circuit is not operated in a standby mode.

The aforementioned and other aspects, features and advantages will become more apparent from the following detailed description of a preferred embodiment given with reference to the accompanying drawings.

BEST MODE FOR CARRYING OUT THE INVENTION

Referring to the drawings, an embodiment of the present invention is described in detail.

Figure 1:
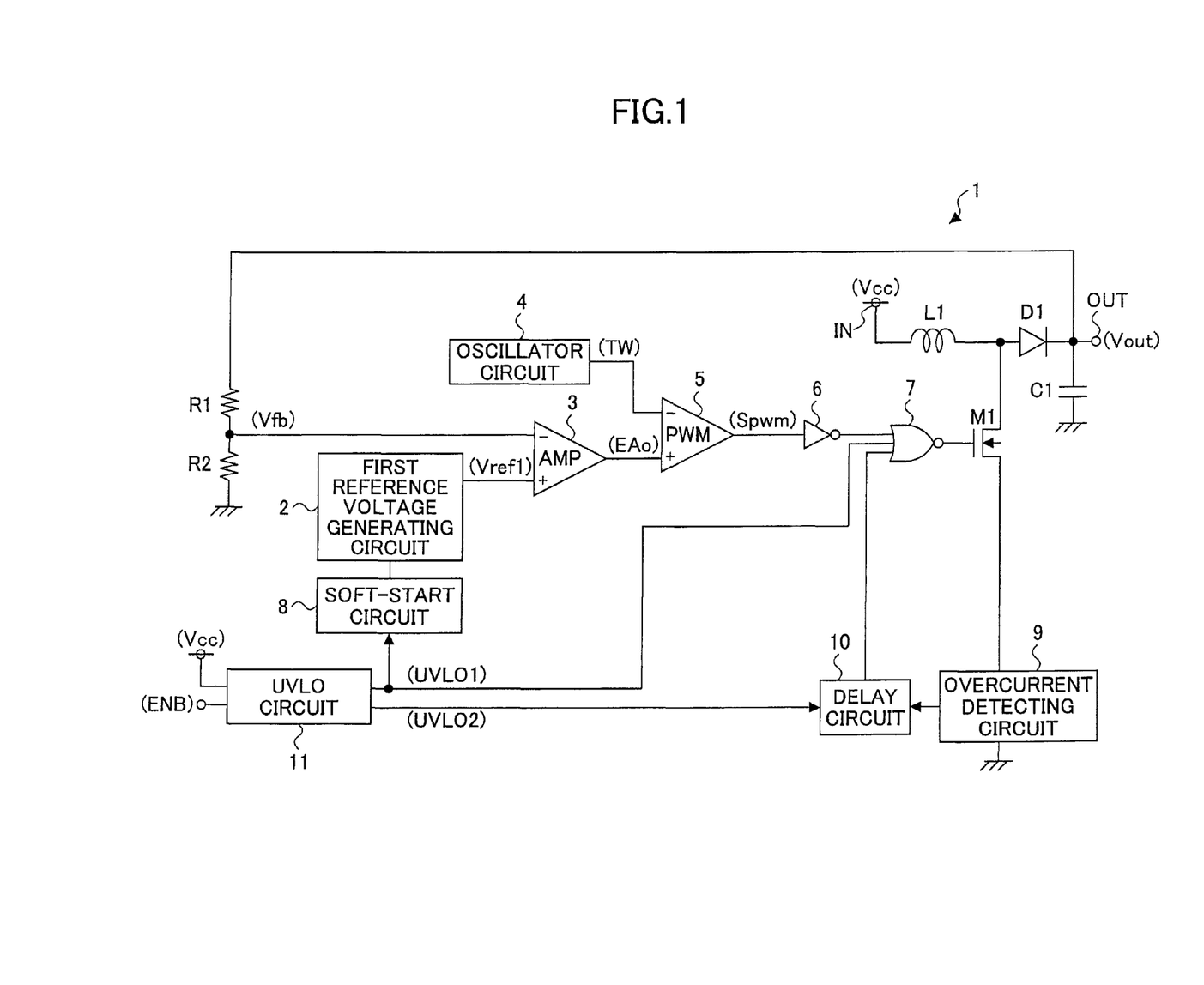
FIG. 1 is a circuit diagram showing a switching regulator according to an embodiment of the present invention.

FIG. 1 is a circuit diagram showing a switching regulator according to the embodiment of the present invention.

A switching regulator 1 shown in FIG. 1 is a boost type switching regulator of an asynchronous rectifying system in which a power source voltage Vcc input to an input terminal IN as an input voltage is raised to a predetermined constant voltage and the raised voltage is output from an output terminal OUT as an output voltage Vout.

That is, the switching regulator 1 converts the power source voltage Vcc input to the input terminal IN into the predetermined constant voltage and outputs the predetermined constant voltage from the output terminal OUT as the output voltage Vout.

The switching regulator 1 includes an inductor L1, a switching transistor M1 that is an NMOS transistor, and a diode D1 for rectifying a current.

The switching transistor M1 performs switching for executing a voltage boost operation which raises the power source voltage Vcc corresponding to an input control signal, and charges the inductor L1 by using the power source voltage Vcc when the switching transistor M1 conducts a current by being switched to an on status. That is, the inductor L1 is charged by the power source voltage Vcc when the switching transistor M1 is switched to the on status.

The diode D1 causes the inductor L1 to discharge electric charges when charging the inductor L1 is stopped while the switching transistor M1 is switched to the off status.

In addition, the switching regulator 1 further includes a first reference voltage generating circuit 2, resistors R1 and R2, a smoothing capacitor C1, an error amplifier circuit AMP 3, an oscillator circuit 4, a PWM comparator 5, an inverter 6, a NOR circuit 7 having three input terminals, a soft-start circuit 8, an overcurrent detecting circuit 9, a delay circuit 10, and a UVLO circuit 11. The first reference voltage generating circuit 2 generates a predetermined first reference voltage Vref1 and outputs the first reference voltage Vref1. The resistors R1 and R2 detect the output voltage Vout. The oscillator circuit 4 generates a triangular wave signal TW and outputs the triangular wave signal TW.

The switching transistor M1 is a first switching element. The resistors R1 and R2 form an output voltage detecting circuit. The overcurrent detecting circuit 9 and the delay circuit 10 form an overcurrent detecting circuit section.

The first reference voltage generating circuit 2, the resistors R1 and R2, the error amplifier circuit AMP 3, the oscillator circuit 4, the PWM comparator 5, the inverter 6, the NOR circuit 7, and the soft-start circuit 8 form a control circuit section. In addition, the error amplifier circuit AMP 3, the oscillator circuit 4, the PWM comparator 5, the inverter 6, and the NOR circuit 7 form a control circuit.

In the switching regulator 1, the circuits other than the inductor L1 and the capacitor C1 can be integrated into one IC, and the circuits other than at least one of the switching transistor M1 and the diode D1, the inductor L1, and the capacitor C1 can be integrated into one IC.

The inductor L1 is connected between the power source voltage Vcc and the drain of the switching transistor M1, and the overcurrent detecting circuit 9 is connected between the source of the switching transistor M1 and ground potential. The anode of the diode D1 is connected to a connection point of the inductor L1 with the drain of the switching transistor M1, and the cathode of the diode D1 is connected to the output terminal OUT.

The capacitor C1 is connected between the output terminal OUT and ground potential, and the resistors R1 and R2 are connected in series between the output terminal OUT and ground potential. The divided voltage Vfb is output from a connection point of the resistor R1 with the resistor R2. In addition, the divided voltage Vfb is input to an inverting input terminal of the error amplifier circuit AMP 3, and the first reference voltage Vref1 is input to a non-inverting input terminal of the error amplifier circuit AMP 3. An output signal EAo, which is generated from amplifying a voltage difference between the divided voltage Vfb and the first reference voltage Vref1, is output from an output terminal of the error amplifier circuit AMP 3.

The output signal EAo from the error amplifier circuit AMP 3 is input to a non-inverting input terminal of the PWM comparator 5, and the triangular wave signal TW from the oscillator circuit 4 is input to an inverting input terminal of the PWM comparator 5. The PWM comparator 5 outputs a pulse signal Spwm generated when a PWM modulation is applied to the output signal EAo by using the triangular wave signal TW. The signal level of the pulse signal Spwm is inverted by the inverter 6 and the inverted pulse signal Spwm is input to one of input terminals of the NOR circuit 7. The output terminal of the NOR circuit 7 is connected to the gate of the switching transistor M1.

In order to gradually increase the on-duty cycle of the pulse signal Spwm at a predetermined speed for a predetermined period after starting up the switching regulator 1, for example, the soft-start circuit 8 causes the first reference voltage generating circuit 2 to gradually raise the first reference voltage Vref1 at a predetermined speed and prevents a large current from being input to the input terminal IN and the output voltage Vout from being overshot.

The overcurrent detecting circuit 9 detects a current flowing into the switching transistor M1, and determines whether a current output from the output terminal OUT is an overcurrent greater than a predetermined current. When the overcurrent detecting circuit 9 detects the overcurrent, the overcurrent detecting circuit 9 outputs a predetermined signal to the delay circuit 10; when a predetermined delay period has passed after the predetermined signal has been input to the delay circuit 10, the delay circuit 10 makes a signal which is input to one of the input terminals of the NOR circuit 7 a high level.

The UVLO circuit 11 monitors the power source voltage Vcc, and when the power source voltage Vcc becomes a value less than a first predetermined value, the UVLO circuit 11 raises a first low voltage detection signal UVLO1 from a low level to a high level. When the power source voltage Vcc becomes a value less than a second predetermined voltage lower than the first predetermined voltage, the UVLO circuit 11 raises a second low voltage detection signal UVLO2 from a low level to a high level.

When the first low voltage detection signal UVLO1 of the high level is input to the soft-start circuit 8, the soft-start circuit 8 initializes the soft-start circuit 8 so that a soft-start operation can be executed when the voltage boost operation restarts. When the second low voltage detection signal UVLO2 of the high level is input to the delay circuit 10, the delay circuit 10 resets the counting number of the delay timer to an initial value by stopping the delay timer which counts (times) the delay period.

When an enable signal ENB which is input from an external device is a low level, the UVLO circuit 11 monitors the power source voltage Vcc, and when the enable signal ENB is a high level, the UVLO circuit 11 stops monitoring the power source voltage Vcc, and causes the first low voltage detection signal UVLO1 and the second low voltage detection signal UVLO2 to be corresponding high levels. Therefore, the switching transistor M1 is switched off and enters a cut-off status, and the voltage boost operation is stopped.

Figure 2:
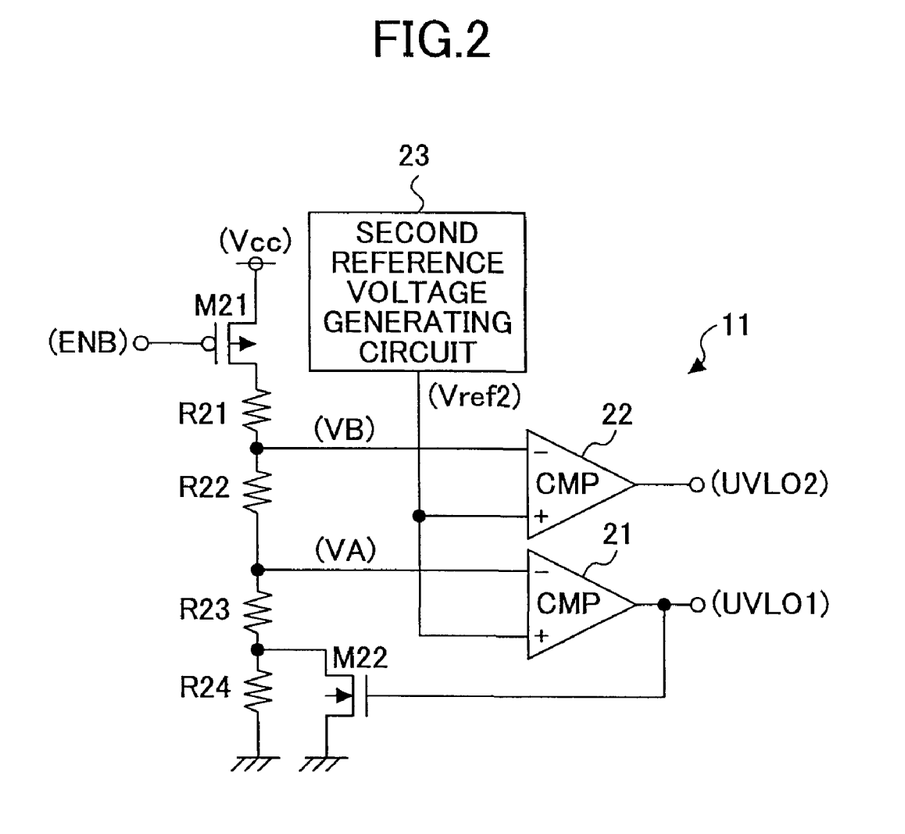
FIG. 2 is a circuit diagram showing a first example of a UVLO circuit shown in FIG. 1.

FIG. 2 is a circuit diagram showing a first example of the UVLO circuit 11 shown in FIG. 1.

As shown in FIG. 2, the UVLO circuit 11 includes comparators (CMPs) 21 and 22, a second reference voltage generating circuit 23 which generates a second reference voltage Vref2 and outputs the second reference voltage Vref2, a PMOS transistor M21, an NMOS transistor M22, and resistors R21 through R24. The PMOS transistor M21, the NMOS transistor M22, and the resistors R21 through R24 form a proportional voltage generating circuit. The CMP 21 is a first voltage comparing circuit, and the CMP 22 is a second voltage comparing circuit. The resistors 21 through 24 form a voltage dividing circuit, the PMOS transistor M21 is a first switch, and the NMOS transistor M22 is a second switch. A divided voltage VA is a first proportional voltage and a divided voltage VB is a second proportional voltage which divided voltages are proportional to the power source voltage Vcc.

The PMOS transistor M21 and the resistors R21 through R24 are connected in series between the power source voltage Vcc and ground potential, and the NMOS transistor M22 is connected to the resistor R24 in parallel. The enable signal ENB is input to the gate of the PMOS transistor M21 from the external device. The divided voltage VA of the power source voltage Vcc is input to an inverting input terminal of the CMP 21 from a connection point of the resistor R22 with the resistor R23. The divided voltage VB of the power source voltage Vcc is input to an inverting input terminal of the CMP 22 from a connection point of the resistor R21 with the resistor R22.

The second reference voltage Vref2 is input to corresponding non-inverting input terminals of the CMPs 21 and 22, and an output terminal of the CMP 21 is connected to the gate of the NMOS transistor 22. The first low voltage detection signal UVLO1 is output from the output terminal of the CMP 21, and the second low voltage detection signal UVLO2 is output from an output terminal of the CMP 22.

Figure 3:
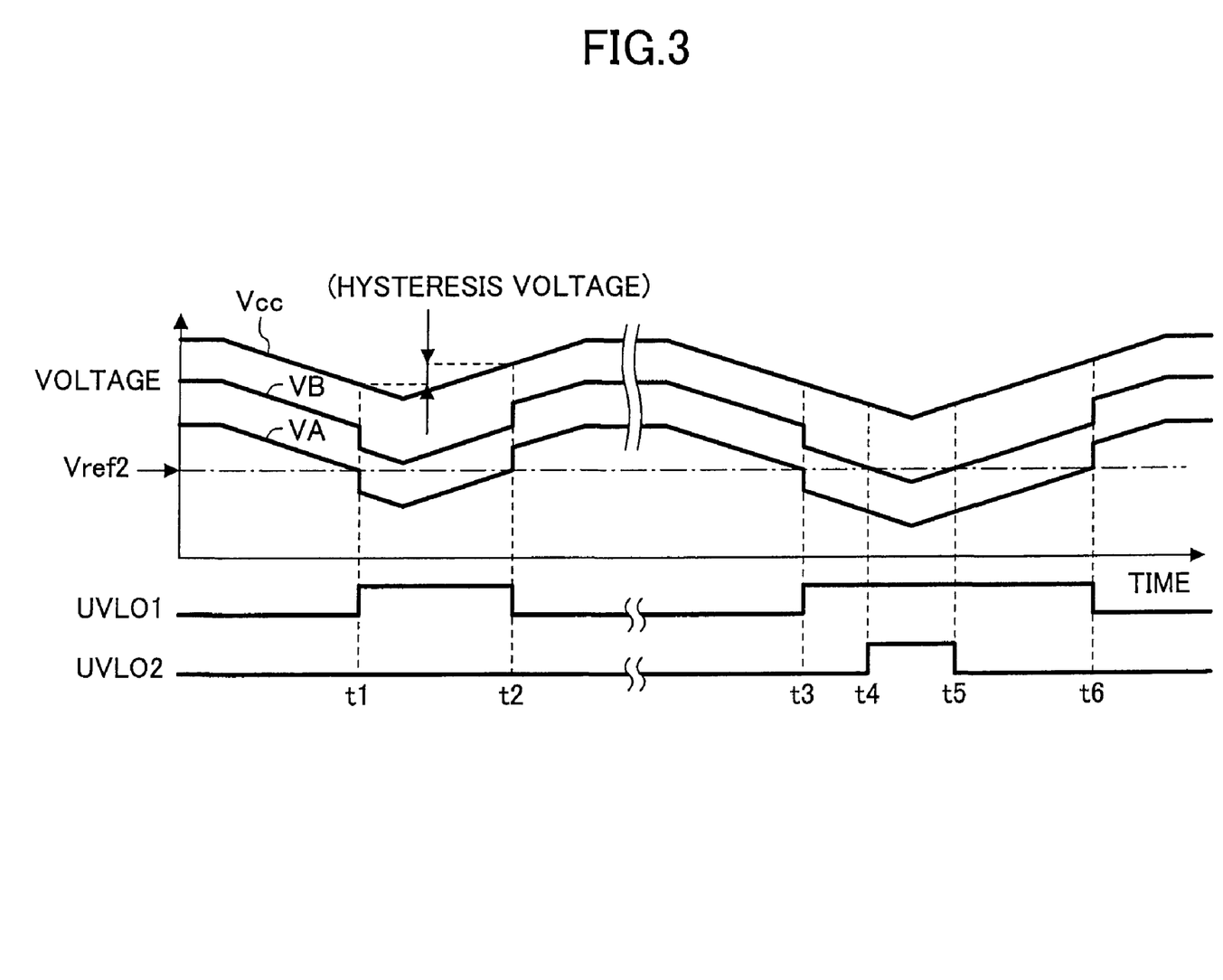
FIG. 3 is a timing chart showing operations of the UVLO circuit shown in FIG. 2.

FIG. 3 is a timing chart showing operations of the UVLO circuit 11 shown in FIG. 2. Referring to FIGS. 2 and 3, the operations of the UVLO circuit 11 are described. As described above, the divided voltages VA and VB are proportional to the power source voltage Vcc. However, in FIG. 3, in order to simplify the description, the divided voltages VA and VB are shown parallel to the power source voltage Vcc. When the enable signal ENB becomes a low level, the power source voltage Vcc is applied to the series circuit of the resistors R21 through R24, and the divided voltages VA and VB proportional to the power source voltage Vcc are output. When the power source voltage Vcc is lowered due to some reason, the divided voltages VA and VB are lowered proportional to the power source voltage Vcc.

When the divided voltage VA becomes less than the second reference voltage Vref2 at the time t1, the first low voltage detection signal UVLO1 rises from the low level to the high level. When the first low voltage detection signal UVLO1 becomes the high level, the NMOS transistor M22 is turned on (switched on) and the NMOS transistor M22 enters a conduction status so that the current does not flow into the resistor R24, and the divided voltages VA and VB are lowered. That is, the R24 is short-circuited.

When the first low voltage detection signal UVLO1 becomes the high level, the UVLO circuit 11 causes the control circuit section to switch off the switching transistor M1.

After this, the power source voltage Vcc continues to be lowered; however, the power source voltage Vcc is changed to rise before the divided voltage VB is lowered to a voltage less than the second reference voltage Vref2, and when the divided voltage VA becomes the second reference voltage Vref2 or more at the time t2, the first low voltage detection signal UVLO1 falls from the high level to the low level. Then the NMOS transistor M22 is turned off and enters a cut-off status, and the divided voltages VA and VB are raised.

Next, when the divided voltage VA becomes less than the second reference voltage Vref2 again at the time t3, the first low voltage detection signal UVLO1 becomes the high level, the NMOS transistor M22 is turned on, and the divided voltages VA and VB are lowered. Further, when the power source voltage Vcc is lowered and the divided voltage VB becomes less than the second reference voltage Vref2 at the time t4, the second low voltage detection signal UVLO2 is changed from the low level to the high level. The second low voltage detection signal UVLO2 of the high level stops the delay timer of the delay circuit 10, and resets the delay period to the initial value.

After this, when the power source voltage Vcc is raised and the divided voltage VB becomes equal to or greater than the second reference voltage Vref2 at the time t5, the second low voltage detection signal UVLO2 falls from the high level to the low level. In addition, when the divided voltage VA becomes equal to or greater than the second reference voltage Vref2 at the time t6, the first low voltage detection signal UVLO1 falls from the high level to the low level, the NMOS transistor M22 is turned off, and the divided voltages VA and VB are raised.

As described above, in the UVLO circuit 11 shown in FIG. 2, the power source voltage Vcc is connected to the voltage dividing circuit formed of the series circuit of the resistors R21 through R24, and the divided voltages VA and VB are compared with only the second reference voltage Vref2. Therefore, the timings are not reversed in which the first low voltage detection signal UVLO1 and the second low voltage detection signal UVLO2 become the high level. That is, the first low voltage detection signal UVLO1 becomes the high level earlier than the second low voltage detection signal UVLO2.

In addition, in a case where the operations of the switching regulator 1 are stopped, when the enable signal ENB is made to be the high level, the power supply from the power source voltage Vcc to the series circuit of the resistors R21 through R24 is cut off. Therefore, the power consumption can be lowered.

Further, a hysteresis voltage is provided so that the power source voltage Vcc when the first low voltage detection signal UVLO1 falls from the high level to the low level is greater than the power source voltage Vcc when the first low voltage detection signal UVLO1 rises from the low level to the high level. Therefore, chattering noise of the first low voltage detection signal UVLO1 can be lowered.

Similarly, this is not shown in FIG. 3; however, a hysteresis voltage can be provided so that the power source voltage Vcc when the second low voltage detection signal UVLO2 falls from the high level to the low level is greater than the power source voltage Vcc when the second low voltage detection signal UVLO2 rises from the low level to the high level. Therefore, chattering noise of the second low voltage detection signal UVLO2 can be lowered.

Figure 4:
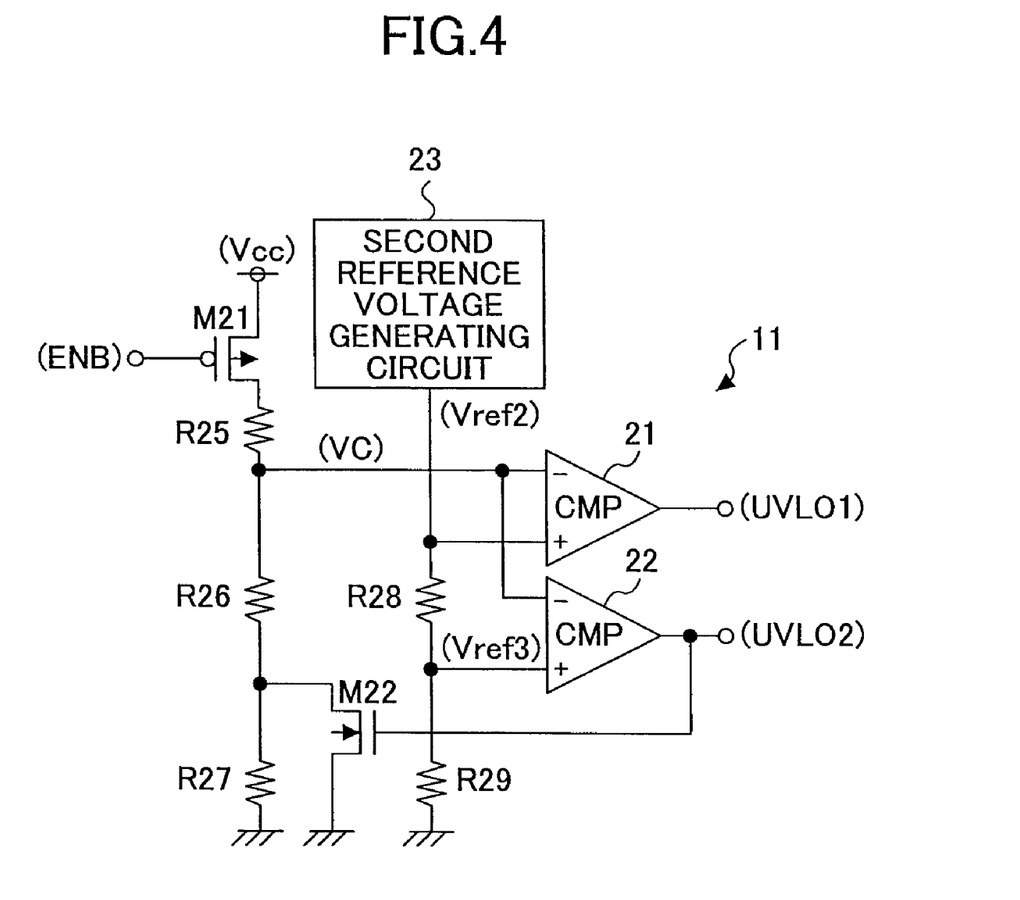
FIG. 4 is a circuit diagram showing a second example of the UVLO circuit shown in FIG. 1.

FIG. 4 is a circuit diagram showing a second example of the UVLO circuit 11 shown in FIG. 1. In FIG. 4, when an element is similar to or the same as that shown in FIG. 2, the same reference number as that shown in FIG. 2 is used for the element.

As shown in FIG. 4, the UVLO circuit 11 includes comparators (CMPs) 21 and 22, a second reference voltage generating circuit 23 which generates a second reference voltage Vref2 and outputs the second reference voltage Vref2, a PMOS transistor M21, an NMOS transistor M22, and resistors R25 through R29. The PMOS transistor M21, the NMOS transistor M22, and the resistors R25 through R27 form a proportional voltage generating circuit. The second reference voltage generating circuit 23, and the resistors R28 and R29 form a reference voltage generating circuit section. The resistors 25 through 27 form a voltage dividing circuit, and a divided voltage VC is a third proportional voltage proportional to the power source voltage Vcc.

The PMOS transistor M21 and the resistors R25 through R27 are connected in series between the power source voltage Vcc and ground potential, and the NMOS transistor M22 is connected to the resistor R27 in parallel. The enable signal ENB is input to the gate of the PMOS transistor M21 from the external device. The divided voltage VC of the power source voltage Vcc is input to corresponding inverting input terminals of the CMPs 21 and 22 from a connection point of the resistor R25 with the resistor R26. The resistors R28 and R29 are connected in series between the second reference voltage generating circuit 23 and ground potential. A third reference voltage Vref3, which is obtained by dividing a second reference voltage Vref2, is output from a connection point of the resistor R28 with the resistor R29.

The second reference voltage Vref2 is input to a non-inverting input terminal of the CMP 21, the third reference voltage Vref3 is input to a non-inverting input terminal of the CMP 22, and an output terminal of the CMP 22 is connected to the gate of the NMOS transistor M22. The first low voltage detection signal UVLO1 is output from an output terminal of the CMP 21, and the second low voltage detection signal UVLO2 is output from the output terminal of the CMP 22.

Figure 5:
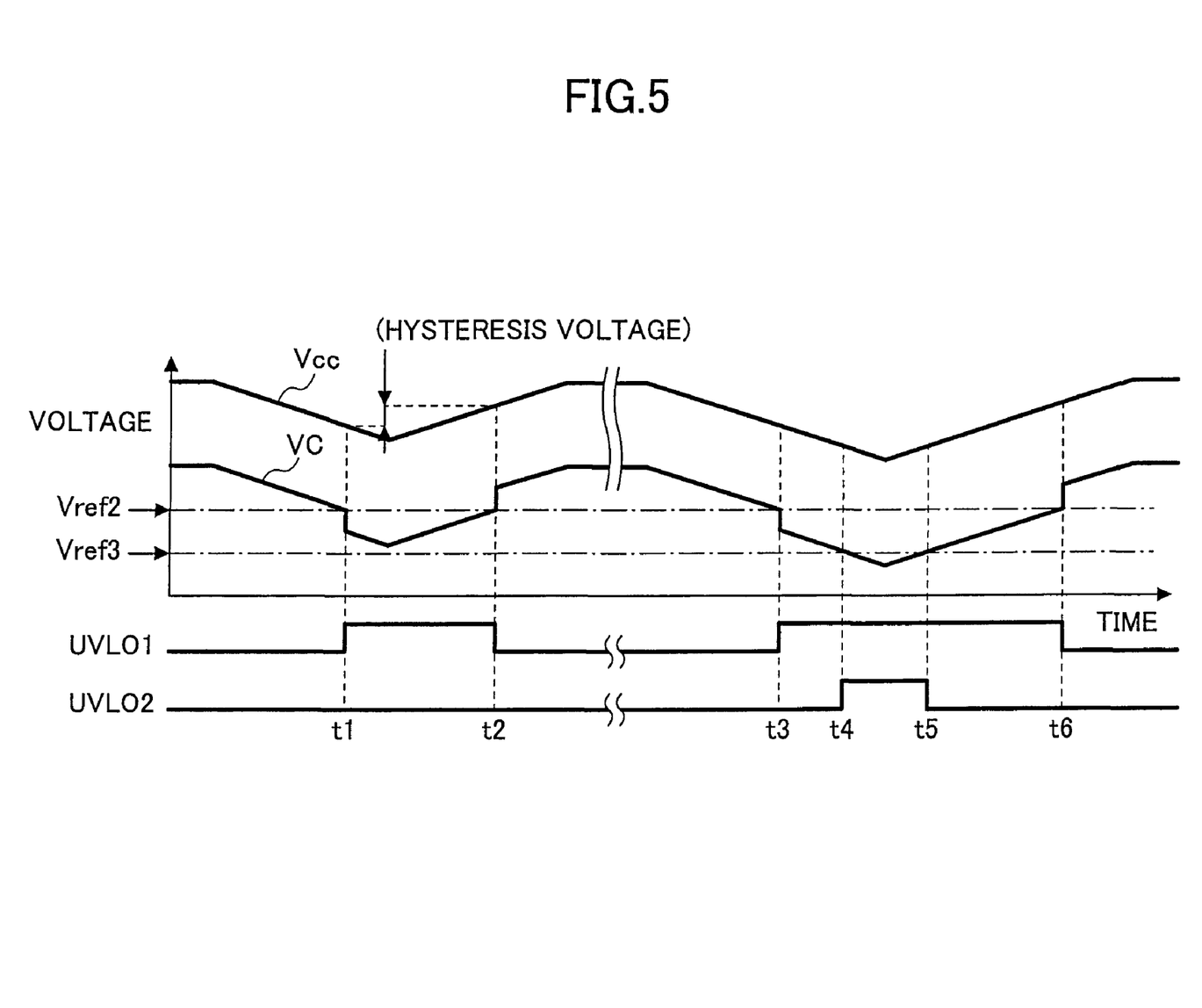
FIG. 5 is a timing chart showing operations of the UVLO circuit shown in FIG. 4.

FIG. 5 is a timing chart showing operations of the UVLO circuit 11 shown in FIG. 4. Referring to FIGS. 4 and 5, the operations of the UVLO circuit 11 are described. As described above, the divided voltage VC is proportional to the power source voltage Vcc. However, in FIG. 5, in order to simplify the description, the divided voltage VC is shown parallel to the power source voltage Vcc.

When the enable signal ENB becomes a low level, the power source voltage Vcc is applied to the series circuit of the resistors R25 through R27, and the divided voltage VC proportional to the power source voltage Vcc is output. When the power source voltage Vcc is lowered due to some reason, the divided voltage VC is lowered proportional to the power source voltage Vcc.

When the divided voltage VC becomes less than the second reference voltage Vref2 at the time t1, the first low voltage detection signal UVLO1 rises from the low level to the high level. When the first low voltage detection signal UVLO1 becomes the high level, the NMOS transistor M22 is turned on and the NMOS transistor M22 enters a conduction status, the current does not flow into the resistor R27, and the divided voltage VC is lowered. That is, the R27 is short-circuited.

When the first low voltage detection signal UVLO1 becomes the high level, the UVLO circuit 11 causes the control circuit section to switch off the switching transistor M1.

After this, the power source voltage Vcc continues to be lowered; however, the power source voltage Vcc is changed to rise before the divided voltage VC is lowered to less than the third reference voltage Vref3, and when the divided voltage VC becomes equal to or greater than the second reference voltage Vref2 at the time t2, the first low voltage detection signal UVLO1 falls from the high level to the low level. Then the NMOS transistor M22 is turned off and enters a cut-off status, and the divided voltage VC is raised.

Next, when the divided voltage VC becomes less than the second reference voltage Vref2 again at the time t3, the first low voltage detection signal UVLO1 becomes the high level, the NMOS transistor M22 is turned on, and the divided voltage VC is lowered. Further, when the power source voltage Vcc is lowered and the divided voltage VC becomes less than the third reference voltage Vref3 at the time t4, the second low voltage detection signal UVLO2 is changed from the low level to the high level. The second low voltage detection signal UVLO2 of the high level stops the delay timer of the delay circuit 10, and resets the delay period to the initial value.

After this, when the power source voltage Vcc is raised and the divided voltage VC becomes equal to or grater than the third reference voltage Vref3 at the time t5, the second low voltage detection signal UVLO2 falls from the high level to the low level. In addition, when the divided voltage VC becomes equal to or grater than the second reference voltage Vref2 at the time t6, the first low voltage detection signal UVLO1 falls from the high level to the low level, the NMOS transistor M22 is turned off, and the divided voltage VC is raised.

As described above, in the UVLO circuit 11 shown in FIG. 4, the power source voltage Vcc is connected to the voltage dividing circuit formed of the series circuit of the resistors R25 through R27, and the divided voltage VC is compared with the second reference voltage Vref2 and the third reference voltage Vref3 which is obtained by dividing the second reference voltage Vref2 with the use of the voltage dividing circuit formed of the resistors R28 and R29. Therefore, similar to FIG. 2, the timings are not reversed in which the first low voltage detection signal UVLO1 and the second low voltage detection signal UVLO2 become the high level. That is, the first low voltage detection signal UVLO1 becomes the high level earlier than the second low voltage detection signal UVLO2.

In addition, in a case where the operations of the switching regulator 1 are stopped, when the enable signal ENB is made to be the high level, the power supply from the power source voltage Vcc to the series circuit of the resistors R25 through R27 is cut off. Therefore, the power consumption can be lowered.

Further, a hysteresis voltage is provided so that the power source voltage Vcc when the first low voltage detection signal UVLO1 falls from the high level to the low level is greater than the power source voltage Vcc when the first low voltage detection signal UVLO1 rises from the low level to the high level. Therefore, chattering noise of the first low voltage detection signal UVLO1 can be lowered.

Similarly, this is not shown in FIG. 5; however, a hysteresis voltage can be provided so that the voltage of the power source voltage Vcc when the second low voltage detection signal UVLO2 falls from the high level to the low level is greater than the power source voltage Vcc when the second low voltage detection signal UVLO2 rises from the low level to the high level. Therefore, chattering noise of the second low voltage detection signal UVLO2 can be lowered.

Figure 6:
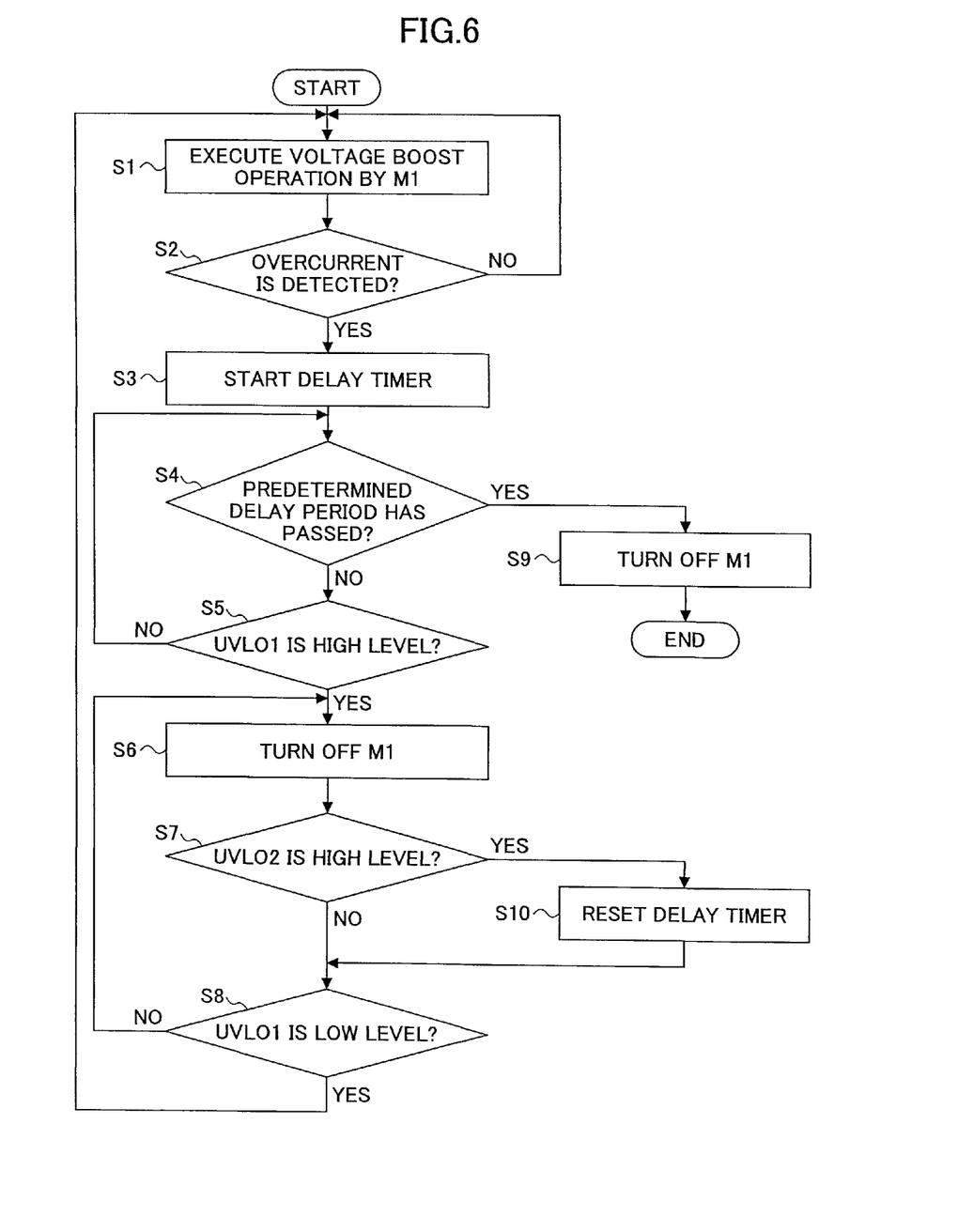
FIG. 6 is a flowchart showing processes in the switching regulator shown in FIG. 1.

FIG. 6 is a flowchart showing processes in the switching regulator 1 shown in FIG. 1.

Referring to FIG. 6, the processes in the switching regulator 1 are described when the overcurrent detecting circuit 9 detects an overcurrent and the power source voltage Vcc is lowered.

First, the switching transistor M1 executes a voltage boost operation by being tuned on (switched on) while PWM control is applied to the switching transistor M1 (S1). The overcurrent detecting circuit 9 determines whether an overcurrent is detected (S2). When the overcurrent detecting circuit 9 does not determine that an overcurrent is detected (NO in S1), the process returns to S1. When the overcurrent detecting circuit 9 determines that an overcurrent is detected (YES in S2), the overcurrent detecting circuit 9 outputs a signal signifying that an overcurrent is detected to the delay circuit 10, and the delay circuit 10 causes the delay timer to start counting a delay period (S3).

The delay circuit 10 determines whether the delay timer has completed to count a predetermined delay period; that is, whether the predetermined delay period has passed (S4). When the predetermined delay period has passed (YES in S4), the delay circuit 10 outputs a high level signal to one of the input terminals of the NOR circuit 7, and the NOR circuit 7 turns off (switchs off) the switching transistor M1 (S9). The switching transistor M1 enters a cut-off status, stops the voltage boost operation, and the process ends. From this status, the voltage boost operation is not started again until the delay timer of the delay circuit 10 is reset.

When the predetermined delay period has not passed (NO in S4), the UVLO circuit 11 determines whether the power source voltage Vcc is lowered to be less than a first predetermined value; that is, whether the UVLO circuit 11 outputs the first low voltage detection signal UVLO1 of a high level (S5). When the first low voltage detection signal UVLO1 of a low level is output (NO in S5), the process returns to S4. When the first low voltage detection signal UVLO1 of a high level is output (YES in S5), the switching transistor M1 is turned off and the switching transistor M1 enters a cut-off status (S6). That is, during the period when the delay timer of the delay circuit 10 is counting the delay period, in S5, the UVLO circuit 11 monitors the power source voltage Vcc. When the divided voltage VA is lowered to be equal to or less than the second reference voltage Vref2 before the delay timer completes the counting, the first low voltage detection signal UVLO1 is made to be the high level, and the switching transistor M1 is turned off.

Next, the UVLO circuit 11 determines whether the power source voltage Vcc is lowered to less than a second predetermined value lower than the first predetermined value; that is, whether the UVLO circuit 11 outputs the second low voltage detection signal UVLO2 of a high level (S7). When the second low voltage detection signal UVLO2 of a low level is output (NO in S7), the UVLO circuit 11 determines whether the power source voltage Vcc is not raised to be equal to or greater than the first predetermined value; that is, the UVLO circuit 11 determines whether the first low voltage detection signal UVLO1 of a low level is output (S8). When the first low voltage detection signal UVLO1 of a low level is output (YES in S8), the process returns to S1.

When the UVLO circuit 11 outputs the first low voltage detection signal UVLO1 of a high level (NO in S8), the process returns to S6. When the UVLO circuit 11 outputs the second low voltage detection signal UVLO2 of a high level (YES in S7), the delay circuit 10 stops counting the delay period and resets the delay timer to an initial value (S10), and the process goes to S8.

As described above, in the processes from S1 through S8, the delay timer of the delay circuit 10 is not reset and the delay timer continues to count the delay period. Therefore, the processes from S1 through S8 are repeated, the delay timer completes the counting of the delay period in S4, the delay circuit 10 outputs a high level signal to the NOR circuit 7, and the NOR circuit 7 stops the voltage boost operation by turning off the switching transistor M1 in S9. As described above, when the UVLO circuit 11 outputs the first low voltage detection signal UVLO1 of a high level (NO in S8), the process goes to S6; therefore, the switching transistor M1 is turned off.

In FIG. 1, as described above, the switching regulator 1 is the boost type switching regulator of the asynchronous rectifying system. However, the present embodiment can be applied to a boost type switching regulator of a synchronous rectifying system.

Figure 7:
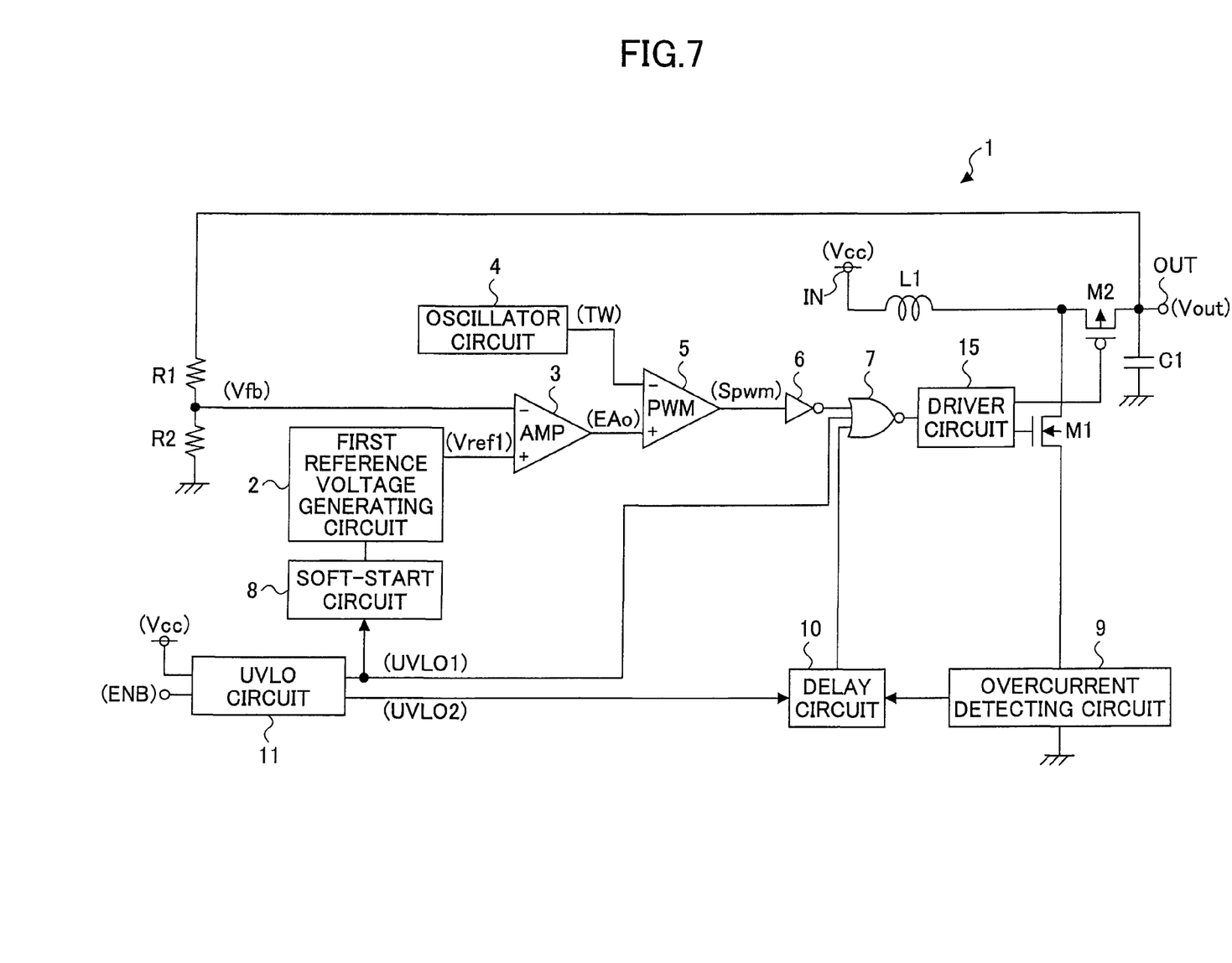
FIG. 7 is a circuit diagram showing a boost type switching regulator of a synchronous rectifying system according to the embodiment of the present invention.

FIG. 7 is a circuit diagram showing the boost type switching regulator of the synchronous rectifying system according to the embodiment of the present invention. In FIG. 7, when an element is similar to or the same as that shown in FIG. 1, the same reference number as that shown in FIG. 1 is used for the element. In addition, in FIG. 7, only points different from those shown in FIG. 1 are described.

As shown in FIG. 7, when the circuit diagram of FIG. 7 is compared with that of FIG. 1, in FIG. 7, the diode D1 shown in FIG. 1 is replaced with a PMOS transistor M2 for synchronous rectification, and a driver circuit 15 is newly included in the circuit diagram. The switching transistor M1 and the PMOS transistor M2 are complementarily turned on/off by the driver circuit 15 corresponding to a signal output from the NOR circuit 7. The other points are the same as those shown in FIG. 1.

The PMOS transistor M2 for synchronous rectification is a second switching element. The first reference voltage generating circuit 2, the resistors R1 and R2, the error amplifier circuit AMP 3, the oscillator circuit 4, the PWM comparator 5, the inverter 6, the NOR circuit 7, the soft-start circuit 8, and the driver circuit 15 form a control circuit section. In addition, the error amplifier circuit AMP 3, the oscillator circuit 4, the PWM comparator 5, the inverter 6, the NOR circuit 7, and the driver circuit 15 form a control circuit.

In addition, in FIG. 1, as described above, the switching regulator 1 is a boost type switching regulator of an asynchronous rectifying system. However, the present embodiment can be applied to a voltage step-down type switching regulator of an asynchronous rectifying system.

Figure 8:
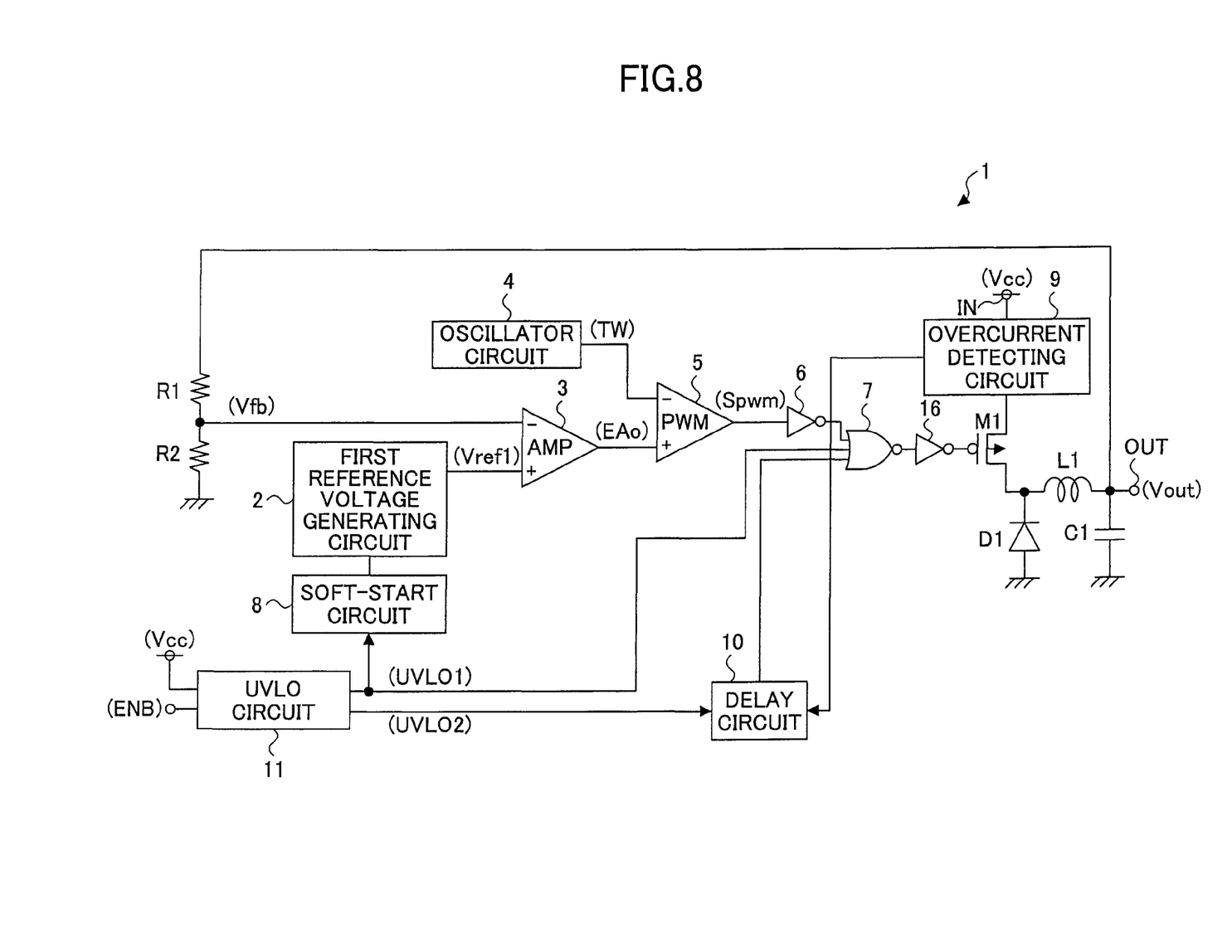
FIG. 8 is a circuit diagram showing a voltage step-down type switching regulator of an asynchronous rectifying system according to the embodiment of the present invention.

FIG. 8 is a circuit diagram showing the voltage step-down type switching regulator of the asynchronous rectifying system according to the embodiment of the present invention. In FIG. 8, when an element is similar to or the same as that shown in FIG. 1, the same reference number as that shown in FIG. 1 is used for the element. In addition, in FIG. 8, only points different from those shown in FIG. 1 are described.

As shown in FIG. 8, when the circuit diagram of FIG. 8 is compared with that of FIG. 1, in FIG. 8, the NMOS switching transistor M1 shown in FIG. 1 is replaced with a PMOS switching transistor M1, and an inverter 16 is newly included in the circuit diagram between the output terminal of the NOR circuit 7 and the gate of the switching transistor M1. Further, the connections among the switching transistor M1, the diode D1, the inductor L1, and the overcurrent detecting circuit 9 are different from those shown in FIG. 1. In FIG. 8, the inverter 16 is newly added to the circuit diagram; however, the inverter 16 and the NOR circuit 7 can be formed in one OR circuit.

In FIG. 8, the output terminal of the NOR circuit 7 is connected to the gate of the switching transistor M1 via the inverter 16. The overcurrent detecting circuit 9 is connected between the power source voltage Vcc and the source of the switching transistor M1. The inductor L1 is connected between the drain of the switching transistor M1 and the output terminal OUT. The cathode of the diode D1 is connected to a connection point of the switching transistor M1 with the inductor L1, and the anode of the diode D1 is connected to ground potential. The others points are the same as those shown in FIG. 1.

In addition, in FIG. 8, as described above, the switching regulator 1 is a voltage step-down type switching regulator of an asynchronous rectifying system. However, the present embodiment can be applied to a voltage step-down type switching regulator of a synchronous rectifying system.

Figure 9:
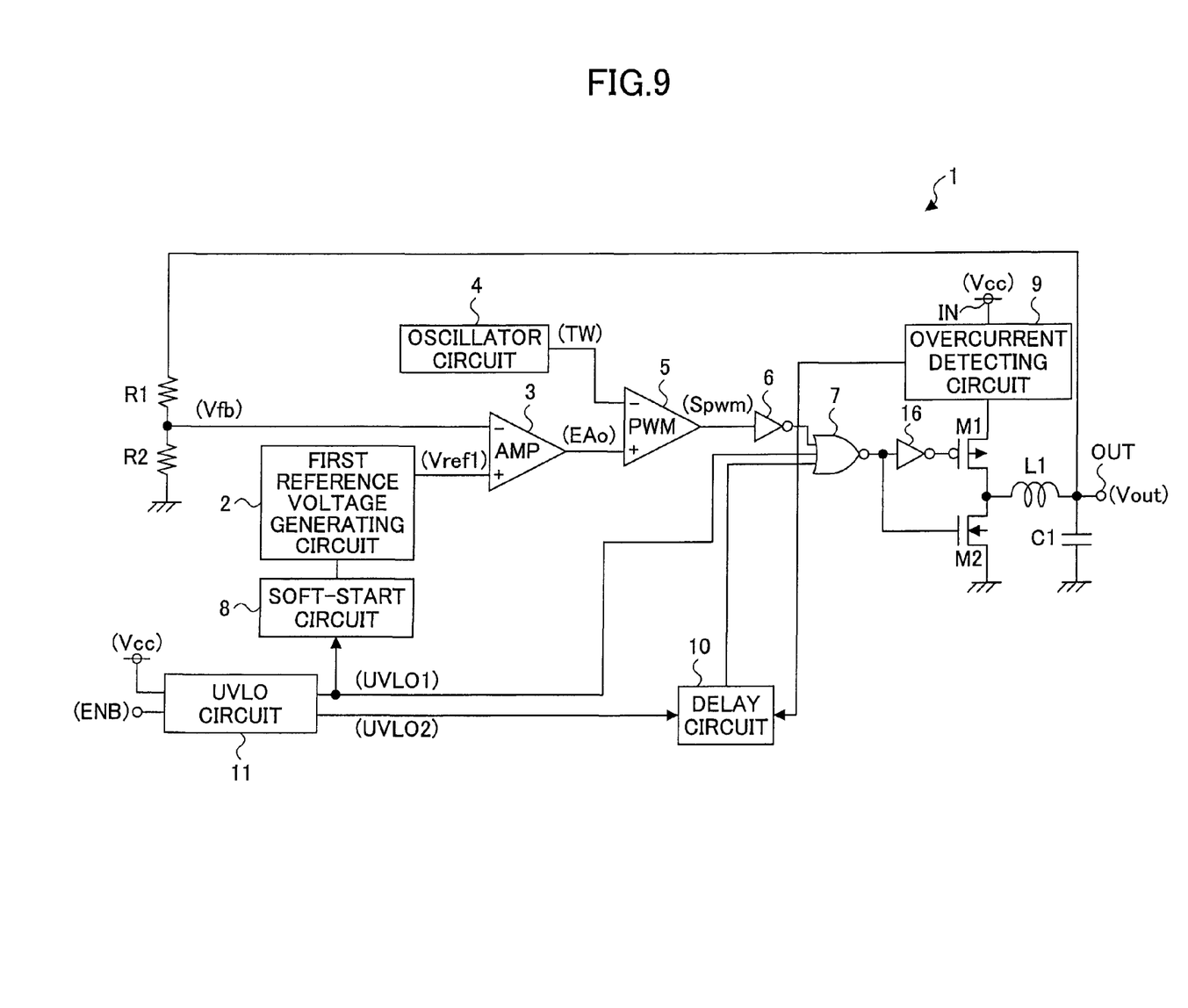
FIG. 9 is a circuit diagram showing a voltage step-down type switching regulator of a synchronous rectifying system according to the embodiment of the present invention.

FIG. 9 is a circuit diagram showing the voltage step-down type switching regulator of the synchronous rectifying system according to the embodiment of the present invention. In FIG. 9, when an element is similar to or the same as that shown in FIG. 8, the same reference number as that shown in FIG. 8 is used for the element. In addition, in FIG. 9, only points different from those shown in FIG. 8 are described.

As shown in FIG. 9, when the circuit diagram of FIG. 9 is compared with that of FIG. 8, in FIG. 9, the diode D1 shown in FIG. 8 is replaced with an NMOS transistor M2 for synchronous rectification, and the NMOS transistor M2 for synchronous rectification is turned on/off corresponding to a signal output from the NOR circuit 7. The other points are the same as those shown in FIG. 8.

As described above, according to an embodiment of the present invention, in the switching regulator 1, when the power source voltage Vcc is lowered to the first predetermined value, the voltage boost operation or the voltage step-down operation is temporarily stopped, and the delay timer of the delay circuit 10 is not reset. That is, even if the overcurrent detection is executed again due to the rise of the power source voltage Vcc after temporarily stopping the voltage boost operation or the voltage step-down operation, the delay timer of the delay circuit 10 continues to count the delay period. Therefore, the voltage boost operation or the voltage step-down operation is completely stopped from a signal output from the delay circuit 10 when the delay timer completes the counting after passing a predetermined delay period. Consequently, the overcurrent preventing operation can be surely executed.

In an embodiment of the present invention, the UVLO circuit 11 generates the two low voltage detection signals UVLO1 and UVLO2. However, the UVLO circuit 11 can generate three or more low voltage detection signals corresponding to a request in the switching regulator 1.

Further, the present invention is not limited to the embodiment, but various variations and modifications may be made without departing from the scope of the present invention.

The present invention is based on Japanese Priority Patent Application No. 2007-149274 filed on Jun. 5, 2007, with the Japanese Patent Office, the entire contents of which are hereby incorporated herein by reference.

The invention claimed is:

1. A switching regulator which converts a power source voltage input to an input terminal into a predetermined constant voltage and outputs the predetermined constant voltage from an output terminal as an output voltage, comprising:
   a first switching element which switches between on and off statuses corresponding to an input control signal;
   an inductor which is electrically charged by the power source voltage when the first switching element is switched to the on status;
   a rectifying element which causes the inductor to discharge electric charges when charging of the inductor is stopped while the first switching element is switched to the off status;
   a control circuit section which controls switching the first switching element between the on and off statuses so that the output voltage to be output from the output terminal becomes equal to the predetermined constant voltage;
   an overcurrent detecting circuit section which detects an overcurrent output from the output terminal and causes the control circuit section to switch off the first switching element so that the first switching element enters a cut-off status when a predetermined delay period has passed after detection of the overcurrent; and
   an UVLO (under-voltage lockout) circuit which causes the control circuit section to switch off the first switching element, when the power source voltage is lowered to a value less than a first predetermined value,
   the UVLO circuit causing the overcurrent detecting circuit section to stop counting the delay period and to reset the delay period to an initial value, when the power source voltage is lowered to a value less than a second predetermined value which is lower than the first predetermined value, wherein the UVLO circuit includes
   a proportional voltage generating circuit which generates a first proportional voltage that is proportional to the power source voltage and a second proportional voltage that is proportional to the power source voltage and is greater than the first proportional voltage, the proportional voltage generating circuit including
      a voltage dividing circuit formed of a plurality of resistors connected in series, to generate the first proportional voltage and the second proportional voltage by dividing the power source voltage and output the first proportional voltage and the second proportional voltage, and
      a first switch that applies the power source voltage to the voltage dividing circuit, in response to a control signal input from an external device,
   a first reference voltage generating circuit which generates a predetermined first reference voltage,
   a first voltage comparing circuit which compares the first proportional voltage with the first reference voltage and generates a first low voltage detection signal signifying a comparison result and outputs the first low voltage detection signal, and
   a second voltage comparing circuit which compares the second proportional voltage with the first reference voltage and generates a second low voltage detection signal signifying a comparison result and outputs the second low voltage detection signal, and wherein
   the control circuit section switches off the first switching element when the first low voltage detection signal output from the first voltage comparing circuit signifies that the first proportional voltage is a value less than the first reference voltage, and
   the overcurrent detecting circuit section is caused to stop counting the delay period and to reset the delay period to an initial value when the second low voltage detection signal output from the second voltage comparing circuit signifies that the second proportional voltage is a value less than the first reference voltage.

2. The switching regulator as claimed in claim 1, wherein:
   a voltage input to the first voltage comparing circuit and the second voltage comparing circuit has a hysteresis voltage.

3. The switching regulator as claimed in claim 1, wherein the proportional voltage generating circuit further includes
   a second switch that causes at least one of the plural resistors in the voltage dividing circuit to be short-circuited corresponding to the first low voltage detection signal.

4. The switching regulator as claimed in claim 1, wherein:
   the rectifying element is a second switching element for synchronous rectification which causes the inductor to discharge the electric charges by being switched to the on status corresponding to an input control signal; and
   the control circuit section causes the second switching element to complementarily switch to the on status/the off status relative to the first switching element.

5. The switching regulator as claimed in claim 1, the control circuit section including:
   an output voltage detecting circuit which divides the output voltage and outputs the divided voltage;
   a second reference voltage generating circuit which generates a second reference voltage and outputs the second reference voltage;
   a control circuit which controls the first switching element to switch to a selected one of the on status and off status so that the divided voltage becomes equal to the second reference voltage; and
   a soft-start circuit which executes a soft-start operation for causing the second reference voltage generating circuit to gradually raise the second reference voltage at a predetermined speed for a predetermined period after starting up the switching regulator,
   wherein the UVLO circuit initializes the soft-start circuit when the power source voltage is lowered to a value less than the first predetermined value.

6. The switching regulator as claimed in claim 4, the control circuit section including:
   an output voltage detecting circuit which divides the output voltage and outputs the divided voltage;
   a second reference voltage generating circuit which generates a second reference voltage and output the second reference voltage;

a control circuit which controls the first switching element and the second switching element to switch to a selected one of the on status and off status so that the divided voltage becomes equal to the second reference voltage; and a soft-start circuit which executes a soft-start operation for causing the second reference voltage generating circuit to gradually raise the second reference voltage at a predetermined speed for a predetermined period after starting up the switching regulator, wherein the UVLO circuit initializes the soft-start circuit when the power source voltage is lowered to a value less than the first predetermined value.

7. The switching regulator as claimed in claim 1, wherein the first switch of the proportional voltage generating circuit has an on state and an off state, and in a case that the first switch is in the on state, the first switch applies the power source voltage to the UVLO circuit, and in a case that the first switch is in the off state, the first switch cuts off the power source voltage from the UVLO circuit.

8. An operations control method of a switching regulator, wherein the switching regulator includes a first switching element which switches between on and off statuses corresponding to an input control signal, an inductor which is electrically charged by a power source voltage when the first switching element is switched to the on status, a rectifying element which causes the inductor to discharge electric charges when charging of the inductor is stopped while the first switching element is switched to the off status, a control section which controls the first switching element to switch to a selected one of the on status and off status so that an output voltage from an output terminal of the switching regulator becomes equal to a predetermined constant voltage to convert the power source voltage into the predetermined constant voltage, and an overcurrent detecting circuit section and an UVLO (under-voltage lockout) circuit including a proportional voltage generating circuit which generates a proportional voltage proportional to the power source voltage, the proportional voltage generating circuit including a voltage dividing circuit formed of a plurality of resistors connected in series which generates the proportional voltage by dividing the power source voltage and outputs the proportional voltage, and a switch that applies the power source voltage to the voltage dividing circuit, in response to a control signal input from an external device, first reference voltage generating circuit which generates a predetermined first reference voltage, a second reference voltage generating circuit which generates a predetermined second reference voltage lower than the first reference voltage, a first voltage comparing circuit which compares the proportional voltage with the first reference voltage, generates a first low voltage detection signal signifying a comparison result and outputs the first low voltage detection signal, and a second voltage comparing circuit which compares the proportional voltage with the second reference voltage, generates a second low voltage detection signal signifying the comparison result and outputs the second low voltage detection signal;

the control circuit section switches off the first switching element when the first low voltage detection signal output from the first voltage comparing circuit signifies that the proportional voltage is a value less than the first reference voltage; and the overcurrent detecting circuit section is caused to stop counting the delay period and to reset the delay period to an initial value when the second low voltage detection signal output from the second voltage comparing circuit signifies that the proportional voltage is a value less than the second reference voltage, the operations control method comprising the steps of:

detecting, by the overcurrent detecting circuit section, an overcurrent output from the output terminal;

causing the control section to switch off the first switching element so that the first switching element enters a cut-off status, when a predetermined delay period has passed after detection by the overcurrent detecting circuit section of the overcurrent;

causing the first switching element to switch off when the power source voltage is lowered to a value less than a first predetermined value; and causing, by the UVLO circuit, the overcurrent detecting circuit section to stop counting the delay period and to reset the delay period to an initial value, when the power source voltage is lowered to a value less than a second predetermined value which is lower than the first predetermined value.

9. The operations control method of the switching regulator as claimed in claim 8, further comprising the steps of:

generating a proportional voltage proportional to the power source voltage;

generating a first reference voltage and a second reference voltage lower than the first reference voltage;

comparing the proportional voltage with the first reference voltage;

comparing the proportional voltage with the second reference voltage;

switching off the first switching element when the proportional voltage is less than the first reference voltage; and stopping counting the delay period and resetting the delay period to an initial value when the proportional voltage is less than the second reference voltage.

10. The operations control method of the switching regulator as claimed in claim 8, wherein the rectifying element is a second switching element for synchronous rectification which causes the inductor to discharge the electric charges by being switched to the on status corresponding to an input control signal; and the operations control method further includes the step of:

causing the second switching element to complementarily switch to the on status/the off status relative to the first switching element.

11. A switching regulator which converts a power source voltage input to an input terminal into a predetermined constant voltage and outputs the predetermined constant voltage from an output terminal as an output voltage, comprising:

a first switching element which switches between on and off statuses corresponding to an input control signal;

an inductor which is electrically charged by the power source voltage when the first switching element is switched to the on status;

a rectifying element which causes the inductor to discharge electric charges when charging of the inductor is stopped while the first switching element is switched to the off status;

a control circuit section which controls switching the first switching element between the on and off statuses so that the output voltage to be output from the output terminal becomes equal to the predetermined constant voltage;

an overcurrent detecting circuit section which detects an overcurrent output from the output terminal and causes the control circuit section to switch off the first switching element so that the first switching element enters a cut-off status when a predetermined delay period has passed after detection of the overcurrent; and an UVLO (under-voltage lockout) circuit which causes the control circuit section to switch off the first switching element, when the power source voltage is lowered to a value less than a first predetermined value, the UVLO circuit causing the overcurrent detecting circuit section to stop counting the delay period and to reset the delay period to an initial value, when the power source voltage is lowered to a value less than a second predetermined value which is lower than the first predetermined value, wherein the UVLO circuit includes a proportional voltage generating circuit which generates a proportional voltage that is proportional to the power source voltage, the proportional voltage generating circuit including a voltage dividing circuit formed of a plurality of resistors connected in series which generates the proportional voltage by dividing the power source voltage and outputs the proportional voltage, and a first switch that applies the power source voltage to the voltage dividing circuit corresponding to a control signal input from an external device, a first reference voltage generating circuit which generates a predetermined first reference voltage, a second reference voltage generating circuit which generates a predetermined second reference voltage, a first voltage comparing circuit which compares the proportional voltage with the first reference voltage, generates a first low voltage detection signal signifying the comparison result and outputs the first low voltage detection signal, and a second voltage comparing circuit which compares the proportional voltage with the second reference voltage, generates a second low voltage detection signal signifying the comparison result and outputs the second low voltage detection signal, the control circuit section switches off the first switching element when the first low voltage detection signal output from the first voltage comparing circuit signifies that the proportional voltage is a value less than the first reference voltage, and the overcurrent detecting circuit section is caused to stop counting the delay period and to reset the delay period to an initial value when the second low voltage detection signal output from the second voltage comparing circuit signifies that the proportional voltage is a value less than the second reference voltage.

12. The switching regulator as claimed in claim 11, wherein a voltage input to the first voltage comparing circuit and the second voltage comparing circuit has a hysteresis voltage.

13. The switching regulator as claimed in claim 11, wherein the proportional voltage generating circuit further includes a second switch that causes at least one of the plural resistors in the voltage dividing circuit to be short-circuited corresponding to the first low voltage detection signal.

14. The switching regulator as claimed in claim 11, wherein the rectifying element is a second switching element for synchronous rectification which causes the inductor to discharge the electric charges by being switched to the on status corresponding to an input control signal, and the control circuit section causes the second switching element to complementarily switch to the on and off statuses relative to the first switching element.

15. The switching regulator as claimed in claim 11, the control circuit section including:

an output voltage detecting circuit which divides the output voltage and outputs the divided voltage;

a third reference voltage generating circuit which generates a third reference voltage and outputs the third reference voltage;

a control circuit which controls the first switching element to switch to a selected one of the on status and off status so that the divided voltage becomes equal to the third reference voltage; and a soft-start circuit which executes a soft-start operation for causing the third reference voltage generating circuit to gradually raise the third reference voltage at a predetermined speed for a predetermined period after starting up the switching regulator, wherein the UVLO circuit initializes the soft-start circuit when the power source voltage is lowered to a value less than the first predetermined value.

16. The switching regulator as claimed in claim 11, wherein the first switch of the proportional voltage generating circuit has an on state and an off state, and in a case that the first switch is in the on state, the first switch applies the power source voltage to the UVLO circuit, and in a case that the first switch is in the off state, the first switch cuts off the power source voltage from the UVLO circuit.

\* \* \* \* \*